(12) United States Patent
Bedi et al.

(10) Patent No.: US 11,151,026 B2
(45) Date of Patent: Oct. 19, 2021

(54) SYSTEM AND METHOD FOR AUTONOMOUS TESTING

(71) Applicant: Infosys Limited, Bangalore (IN)

(72) Inventors: Harleen Bedi, Bangalore (IN); Smitha Ponnanchery Sidharthan, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 19 days.

(21) Appl. No.: 16/893,791

(22) Filed: Jun. 5, 2020

(65) Prior Publication Data

US 2020/0409829 A1   Dec. 31, 2020

(51) Int. Cl.
  *G06F 11/36*  (2006.01)
  *G06N 3/08*   (2006.01)

(52) U.S. Cl.
  CPC ........ *G06F 11/3688* (2013.01); *G06F 11/368* (2013.01); *G06F 11/3636* (2013.01); *G06F 11/3684* (2013.01); *G06N 3/08* (2013.01)

(58) Field of Classification Search
  CPC .............. G06F 11/3636; G06F 11/368; G06F 11/3684; G06F 11/3688; G06F 11/3692; G06N 20/00; G06N 3/006; G06N 3/08
  See application file for complete search history.

(56) References Cited

U.S. PATENT DOCUMENTS 10,606,736 B1 *  3/2020  Gardner ................ G06F 11/302

OTHER PUBLICATIONS

Nadia Alshahwan et al., Crawlability Metrics for Web Applications, IEEE, 2012, retrieved online on Aug. 13, 2021., pp. 151-160. Retrieved from the Internet: <URL: https://ieeexplore.ieee.org/stamp/stamp.jsp?tp=&arnumber=6200108>. (Year: 2012).*

* cited by examiner

*Primary Examiner* — Hanh Thi-Minh Bui
(74) *Attorney, Agent, or Firm* — Troutman Pepper Hamilton Sanders LLP (Rochester)

(57) ABSTRACT

A method and a system for automated testing of applications includes crawling an application by an application crawler to identify application states. Rewards associated with the application states are calculated using a reinforcement learning engine, based on a reward matrix. Critical paths are identified by the reinforcement learning engine and are passed to a test scenario generator. Test scripts are generated by the test scenario generator based on the identified critical paths. The applications are tested by a test scenario execution engine based on the generated one or more test scripts, and test data generated by the test data generator. Test results are captured by a behavior analyzer. One or more insights are generated by the behavior analyzer, from the captured test results to update the reward matrix and to improve the efficiency of continuous autonomous testing system.

6 Claims, 3 Drawing Sheets

SYSTEM AND METHOD FOR AUTONOMOUS TESTING

This application claims the benefit of Indian Patent Application Serial No. 201941025919 filed Jun. 28, 2019, which is hereby incorporated by reference in its entirety.

FIELD

The field generally relates to software testing. In particular, the present technique relates to testing software using methods that employ machine learning and deep learning.

BACKGROUND

In present day, in software testing, to test functionality of any application, testers need to manually write test cases based on functional or business specifications and then execute the test cases on an application to verify if application is working as designed. This process is extremely time consuming and involves lot of manual effort. To improve efficiencies, testers use test automation tools, proprietary or open source to automate the test execution process, which reduces test case execution time. However, this is still not very efficient method of testing, especially in current state of exponential growth in technology, where the speed of testing is of utmost importance.

Currently, there is no mechanism to generate test cases automatically without human intervention. A solution that can automatically identify test cases can significantly reduce testing effort and reduce time to market.

SUMMARY

Disclosed are a method, a system and/or a non-transitory computer readable storage medium for autonomous testing of applications.

In one aspect, a method for autonomous testing of one or more applications is disclosed. The method comprises steps of crawling through one or more applications to be tested using an application crawler. One or more application states associated with the crawled one or more applications are identified. One or more rewards associated with the one or more identified application states are calculated using a reinforcement learning engine based on a reward matrix, wherein the reward matrix may be domain specific. One or more critical paths are identified by the reinforcement learning engine and are communicated to a test scenario generator. The one or more critical paths maybe such paths with maximum rewards. The maximum rewards may be determined based on at least one of a criticality of navigation associated with a path or an error rate associated with navigating the path.

One or more test scripts are generated by the test scenario generator based on the identified one or more critical paths. One or more applications are tested by a test scenario execution engine based on the generated one or more test scripts, and test data generated by the test data generator. One or more test results based on the tested one or more applications are captured by a behavior analyzer. One or more insights are generated by the behavior analyzer, from the captured one or more results to update the reward matrix. Further the reward matrix is updated by the behavior analyzer based on the generated one or more insights.

In another aspect, a system for autonomous testing of one or more applications is disclosed. The system comprises one or more components, but not limited to at least one processor, an application crawler, a reinforcement learning engine, a test scenario generator, a test data generator, a test scenario execution engine and/or a behavior analyzer. The application crawler is configured to crawl through one or more applications to be tested and is further configured to identify one or more application states associated with the crawled one or more applications. The reinforcement learning engine is configured to calculate the one or more rewards associated with the one or more identified application states based on a reward matrix, wherein the reward matrix may be domain specific. The reinforcement learning engine is further configured to identify one or more critical paths and the identified one or more critical paths are communicated to the test scenario generator. The one or more critical paths maybe such paths with maximum rewards. The maximum rewards may be determined based on at least one of a criticality of a navigation associated with a path or an error rate associated with navigating the path.

The test scenario generator is configured to generate test scripts based on the identified one or more critical paths. The test scenario execution engine is configured to test one or more applications based on the generated one or more test scripts, and test data generated by the test data generator. The behavior analyzer is configured to capture one or more test results based on the tested one or more applications. The behavior analyzer is further configured to generate one or more insights from the captured one or more test results to update the reward matrix.

In yet another aspect, a non-transitory computer readable storage medium for automated testing of one or more applications is disclosed. The non-transitory computer readable storage medium stores computer executable instructions to execute one or more steps, comprising, crawling through one or more applications to be tested using an application crawler. One or more application states associated with the crawled one or more applications are identified. One or more rewards associated with the one or more identified application states are calculated using a reinforcement learning engine based on a reward matrix, wherein the reward matrix may be domain specific. One or more critical paths are identified by the reinforcement learning engine and are communicated to a test scenario generator. The one or more critical paths maybe such paths with maximum rewards. The maximum rewards may be determined based on at least one of a criticality of a navigation associated with a path or an error rate associated with navigating the path.

One or more test scripts are generated by the test scenario generator based on the identified one or more critical paths. One or more applications are tested by a test scenario execution engine based on the generated one or more test scripts, and test data generated by the test data generator. One or more test results based on the tested one or more applications are captured by a behavior analyzer. One or more insights are generated by the behavior analyzer, from the captured one or more results to update the reward matrix. Further the reward matrix is updated by the behavior analyzer based on the generated one or more insights.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The present disclosure enables identification of test cases and/or scenarios automatically, based on deep reinforcement learning, thus eliminating manual effort needed to create the test cases and/or scenarios.

Example embodiments, as described below, may be used to provide a method, a system and a non-transitory computer readable storage medium for autonomous testing of one or more applications. Although the present embodiments have been described with reference to specific exemplary embodiments, it will be evident that various modifications and changes may be made to these embodiments without departing from the broader spirit and scope of the various embodiments.

Exemplary embodiments of the present disclosure provide a method, a system and/or a non-transitory computer readable storage medium for automated testing of one or more applications is disclosed. The method comprises steps of crawling through one or more applications to be tested using an application crawler. One or more application states associated with the crawled one or more applications may be identified. One or more rewards associated with the one or more identified application states may be calculated using a reinforcement learning engine based on a reward matrix, wherein the reward matrix may be domain specific. One or more critical paths may be identified by the reinforcement learning engine and may be communicated to a test scenario generator. The one or more critical paths may be such paths with maximum rewards. The maximum rewards may be determined based on at least one of a criticality of a navigation associated with a path or an error rate associated with navigating the path.

One or more test scripts may be generated by the test scenario generator based on the identified one or more critical paths. One or more applications may be tested by a test scenario execution engine based on the generated one or more test scripts, and test data generated by the test data generator. One or more test results based on the tested one or more applications may be captured by a behavior analyzer. One or more insights may be generated by the behavior analyzer, from the captured one or more results to update the reward matrix. Further the reward matrix may be updated by the behavior analyzer based on the generated one or more insights.

Figure 1:
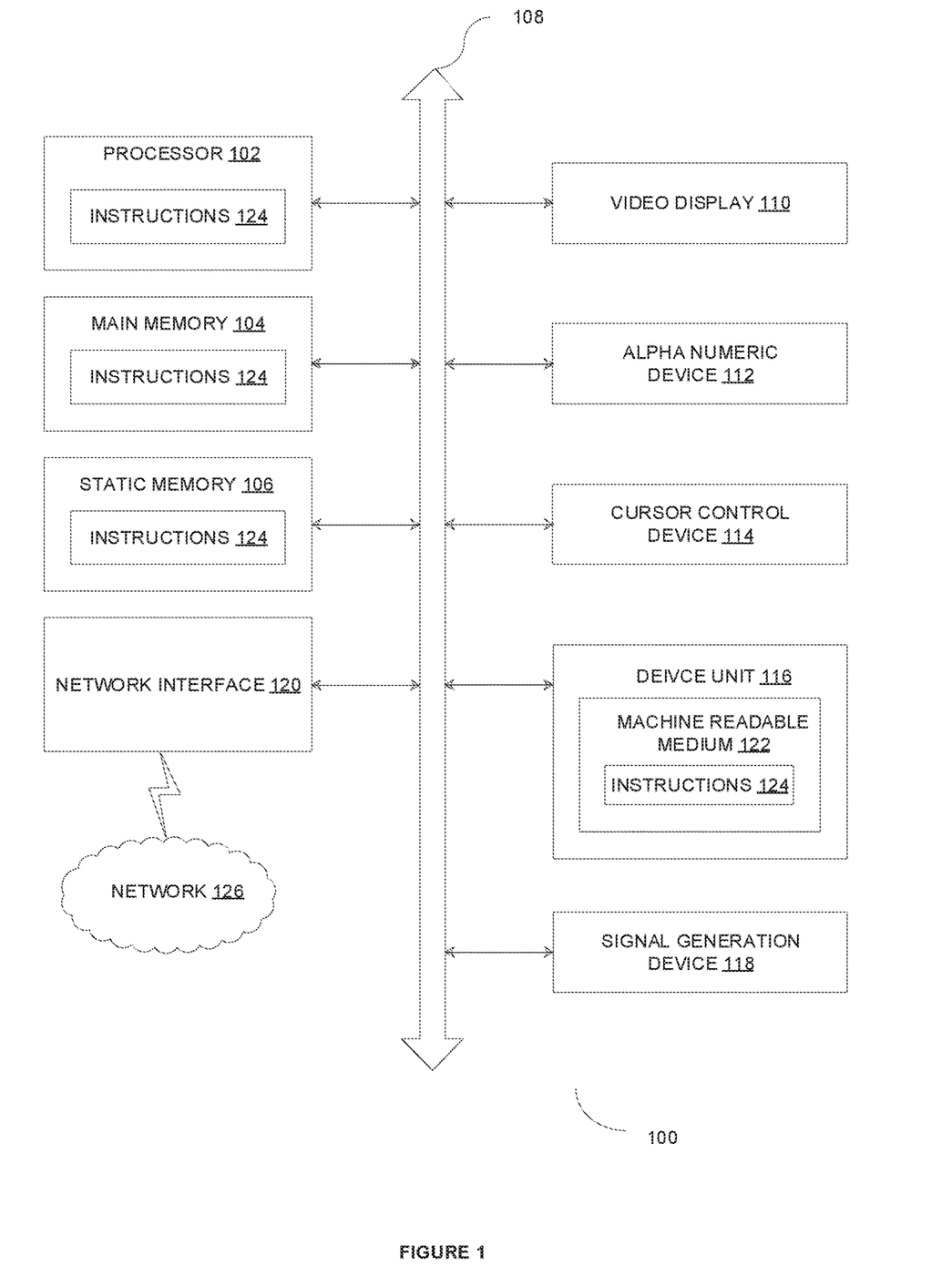
FIG. 1 is a diagrammatic representation of a data processing system capable of processing a set of instructions to perform any one or more of the methodologies herein, according to one or more embodiments.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a computer network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
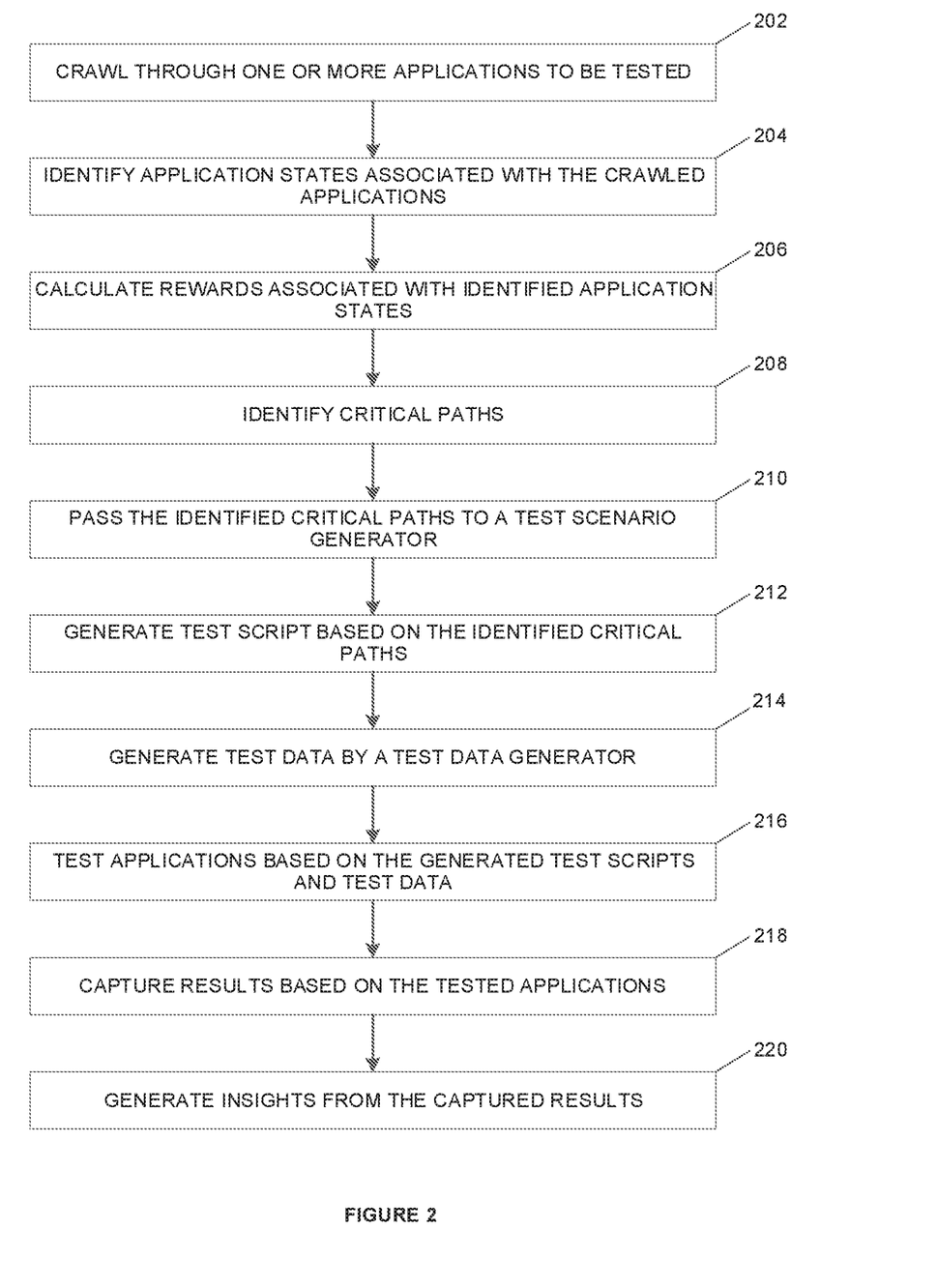
FIG. 2 is a process flow diagram illustrating autonomous testing of one or more applications, according to one or more embodiments.

FIG. 2 is a process flow diagram illustrating autonomous testing of one or more applications, according to one or more embodiments.

In one or more embodiments, one or more applications under test may be crawled by an application crawler, as in step 202. In an example embodiment, one of the one or more applications may be a web application. The web applications may be e-commerce websites, a customer banking applications and the like.

In one or more embodiments, the application crawler may be configured to navigate through each of the one or more pages of a web application under test. The navigated pages to capture one or more application states. The navigation may indicate one or more actions of the user while traversing the website. The one or more states may be the one or more web pages that the user navigates. The one or more webpages may be mapped to a pre-defined reference model to identify the one or more application states of the website.

TABLE 1

| | URL(Application State) | STATE(Predefined Categories) |
|---|---|---|
| A | https://www.abc.com/ | Home page |
| B | https://www.abc.com/skin-care?N=6788 | Product listing page |
| C | https://www.abc.com/skin-care-cleansers?N=7897 | Product listing page |
| D | https://abc.com/bag | Product pages |
| E | https://www.abc.com/hair-shampoo-conditioner-shampoo?N=7890 | Product pages |
| F | https://www.abc.com/special-cleansing-gel?productId=123457 | Product category page |
| G | https://www.abc.com/mineral-hand-cream?productId=790353 | Product category page |
| H | https://www.abc.com/company/about-us/ | Static information pages |
| I | https://abc.com/abc/myaccount/addressbook.jsp | My account pages | may further be classified into different categories by referring to a knowledge system. One or more errors associated with the each of the one or more pages of the web application may also be identified by the application crawler. The one or more errors may be, but not limited to, authorization error, forbidden error, page not found error, request time-out error, and/or server errors such as internal server error, bad gateway, service temporarily unavailable, and gateway time-out. Each of the one or more errors may be associated with predefined values, which may further be used to determine rewards for application states by a reinforcement learning engine. The application crawler may also be configured to evaluate comprehensive page quality check including static accessibility evaluation.

In one or more embodiments, the knowledge system may comprise one or more reference models for one or more business domains. The knowledge system may also comprise one or more user flows and/or validation checks. One or more user flows may be such paths a user follows through website interface to complete a task. The validation checks may be data to validate a web application such as, but not limited to conformity to coding/formatting standards, determining broken links, validation of one or more elements of a web application and the like.

One or more application states associated with the crawled one or more applications may be identified, as in step 204. In an example embodiment, Uniform Resource Locator (URL) of a website to be tested may be received from a user. The navigation of the website may be simulated The reference model may comprise one or more states such as, but not limited to, home page, product page, product listing page, product category page, shopping cart page, billing page, submit order page, order summary page, check out page and/or my account page, as illustrated in Table 1. In one or more embodiments object(s) and/or element(s) present in each of the one or more web pages of the web site may also be identified.

In one or more embodiments, one or more rewards associated with the one or more identified application states may be calculated using a reinforcement learning engine as in step 206. The one or more rewards may be calculated based on a reward matrix, wherein the reward matrix may be domain specific. Table 2 illustrates a sample reward matrix for web applications in e-commerce domain. A reward matrix may be a table containing pre-defined values (rewards) assigned for transition from one page to another page of a web application.

TABLE 2

| States | Home page | Product category page | Product listing page | Product pages | Shopping cart page | Shipping page | Billing page | Submit order page | Order page |
|---|---|---|---|---|---|---|---|---|---|
| Home page | 0 | 80 | 80 | 60 | 60 | 0 | 0 | 0 | 0 |
| Product category page | 10 | 0 | 80 | 80 | 80 | 0 | 0 | 0 | 0 |
| Product listing page | 10 | 10 | 0 | 80 | 80 | 0 | 0 | 0 | 0 |
| Product pages | 10 | 10 | 10 | 0 | 80 | 0 | 0 | 0 | 0 |
| Shopping cart page | 10 | 10 | 10 | 10 | 0 | 80 | 0 | 0 | 0 |
| Shipping page | 10 | 10 | 10 | 10 | 60 | 0 | 80 | 0 | 0 |
| Billing page | 10 | 10 | 10 | 10 | 60 | 30 | 0 | 80 | 0 |
| Submit order page | 10 | 10 | 10 | 10 | 20 | 20 | 30 | 0 | 80 |
| Order page | 40 | 10 | 10 | 10 | 10 | 0 | 0 | 0 | 0 |

In an example embodiment, when the application crawler crawls though a website, it may identify each page of the website as application states and classify each page of the website into one of the predefined categories as illustrated in Table 1. For example, the application crawler may crawl from Page A to Page B and then to Page C. The application crawler may classify each of the crawled pages into at least one of the one or more predefined categories. The application crawler may be configured to pass the identified application states and predefined categories to the reinforcement learning engine. Page A may be a home page, Page B and Page C may be product listing page. The reinforcement learning engine may refer to the reward matrix and may derive a reward related to the traversal of page that was performed. For the traversal from page A to Page B, reinforcement learning engine looks up the reward matrix for transition between home page and product listing page and comes up with the reward of 80. For the transition from page C to page D, since the transition is from product listing page to product page, the reinforcement learning engine may arrive at a reward of 80 by referring to the reward matrix.

One or more critical paths may be identified by the reinforcement learning engine, as in step 208. The one or more critical paths may be one or more such paths with maximum rewards. The maximum rewards may be determined based on at least one of a criticality of a navigation associated with a path or an error rate associated with navigating the path. More the rewards, more the criticality of navigation associated with the path. The error rates may be determined based on frequency of occurrences of the errors during the crawling and/or the predefined values associated with each of the identified errors.

The identified one or more critical paths may be passed to a test scenario generator, as in step 210. One or more test scripts may be generated by the test scenario generator based on the identified one or more critical paths, as in step 212.

Test data may be generated by the test data generator, as in step 214. One or more applications may be tested by a test scenario execution engine based on the generated one or more test scripts and test data, as in step 216. In an example embodiment, the test scenario execution engine may be implemented through an industry standard framework—Selenium. The input to the Selenium may comprise one or more scripts containing one or more critical paths, and/or actions that a user would be carrying out, such as, load URL, click action(s), accessing objects/properties located in the URL and the like. One or more test results based on the tested one or more applications may be captured by a behavior analyzer, as in step 218. The one or more test results may be, but not limited to creation of test log file and/or creation of log entries wherein the log entries may comprise navigated path(s) of the one or more applications under test, error messages and the like.

One or more insights may be generated by the behavior analyzer, from the captured one or more results, as in step 220. The one or more insights may be, but not limited to defects in the navigation, identified critical page, error proneness of the page, page load time, response time, errors and warnings and the like. The behavior analyzer may be configured to check the previous test results and compare it with the captured one or more results. The behavior analyzer may also be configured to analyze log files to generate one or more insights. The outcomes of the comparison may constitute the generated one or more insights. The generated one or more insights may be used to update the reward matrix. For example, consider transition from Page A to Page B. This transition is from Home page to Product category page. Based on the reward matrix, the reward would be 80. Also, based on one or more errors found on page B, values associated with the one or more errors may be added to the reward obtained from the reward matrix for the above mentioned transition. As the application crawler proceeds through the application, the reward value is further updated based on rewards for the subsequent transitions. For some pairs of pages, the rewards could be 0 because there may not be a valid transition (way to navigate) between pages. At the end of at least one iteration of testing, the reward matrix may be updated as illustrated in Table 3.

TABLE 3

| States | Home page | Product category page | Product listing page | Product pages | Shopping cart page | Shipping page | Billing page | Submit order page | Order page |
|---|---|---|---|---|---|---|---|---|---|
| Home page | 50 | 158.8 | 0 | 0 | 0 | 186 | 0 | 0 | 0 |
| Product category page | 0 | 0 | 120 | 0 | 0 | 0 | 0 | 0 | 0 |
| Product listing page | 0 | 0 | 0 | 120 | 0 | 0 | 0 | 0 | 0 |
| Product pages | 0 | 0 | 0 | 0 | 120 | 0 | 0 | 0 | 0 |
| Shopping cart page | 0 | 0 | 0 | 0 | 0 | 210 | 0 | 0 | 0 |
| Shipping page | 111.2 | 0 | 0 | 319.93 | 233.31 | 150 | 319.93 | 0 | 0 |
| Billing page | 0 | 0 | 0 | 291.4 | 211.4 | 90 | 291.4 | 0 | 0 |
| Submit order page | 0 | 0 | 0 | 0 | 0 | 0 | 0 | 148.8 | 120 |
| Order page | 0 | 0 | 0 | 0 | 0 | 0 | 0 | 0 | 0 |

Figure 3:
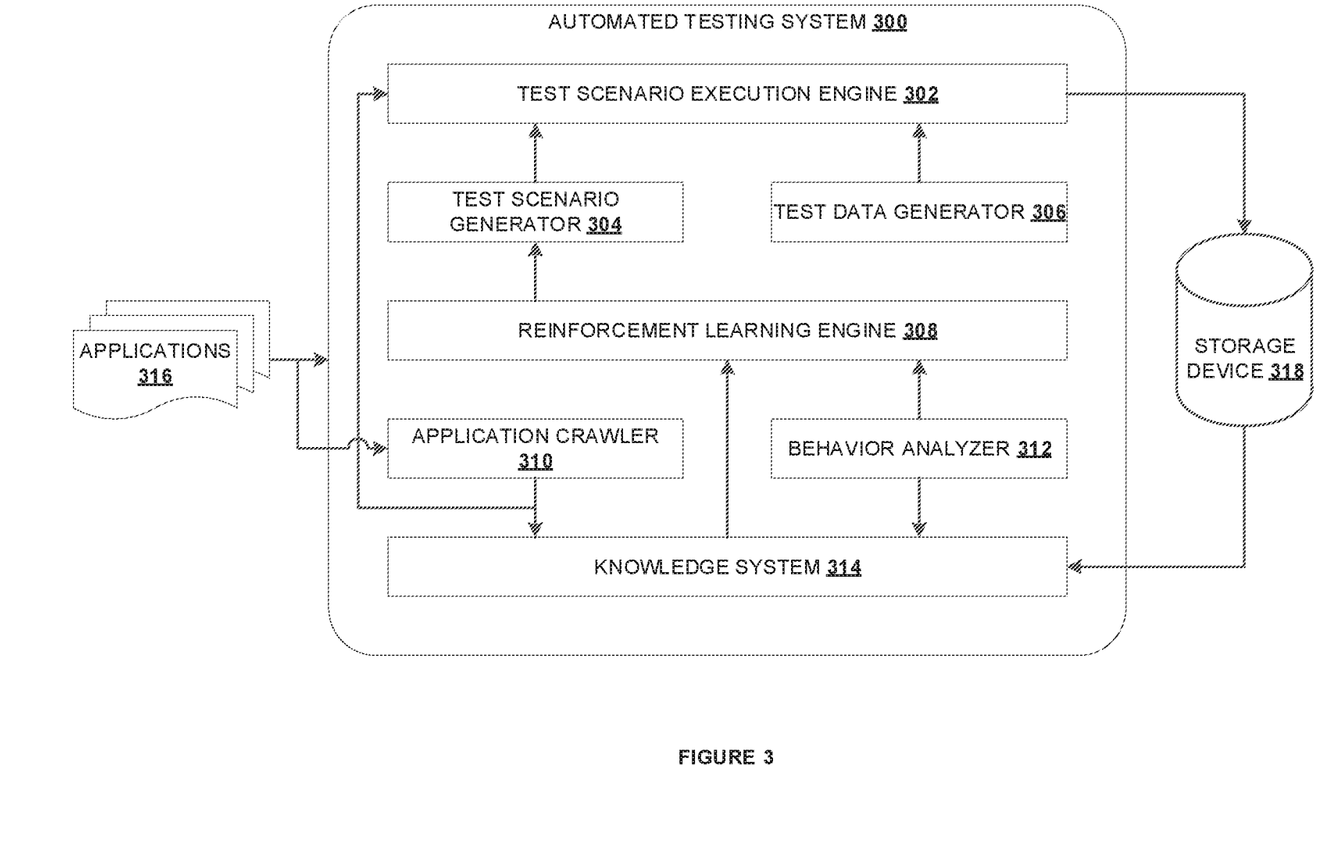
FIG. 3 is an architecture diagram illustrating a system for autonomous testing of one or more applications, according to one or more embodiments.

FIG. 3 is an architecture diagram illustrating autonomous testing system 300, according to one or more embodiments. The automated testing system 300 may comprise one or more components such as, but not limited to a test scenario execution engine 302, a test scenario generator 304, a test data generator 306, a reinforcement learning system 308, an application crawler 310, a behavior analyzer 312, a knowledge system 314, one or more applications 316 received as input by the automated testing system 300 and a storage device 318.

In one or more embodiments, the application crawler 310 may be configured to receive one or more applications 316 and may further be configured to crawl through the received one or more applications 316. The one or more applications may be, but not limited to ecommerce websites, customer banking applications and mobile applications. In an example embodiment, one of the one or more applications 316 may be a web application. The application crawler 310 may be configured to navigate through each of the one or more pages of the web application. The navigated pages may further be classified into different categories by referring to the knowledge system 314.

The application crawler 310 may further be configured to identify one or more errors associated with the each of the one or more pages of the web application. The one or more errors may be, but not limited to authorization error, forbidden error, page not found error, request time-out error and/or server errors such as internal server error, bad gateway, service temporarily unavailable, and gateway time-out. Each of the one or more errors may be associated with predefined values. The predefined values may further be used to determine rewards for each of application states by the reinforcement learning engine 308. The application crawler 310 may also be configured to evaluate comprehensive page quality check including static accessibility evaluation.

In one or more embodiments, the knowledge system 314 may be configured to store one or more reference models for one or more business domains. The knowledge system 314 may further be configured to store one or more user flows and/or validation checks. One or more user flows may be such paths a user follows through website interface. The validation checks may be a data to validate a web application such as, but not limited to conformity to coding/formatting standards, determining broken links, validation of one or more elements of the web application and the like.

In one or more embodiments, the knowledge system 314 may comprise a component called classifier (not shown in the figures), which may be configured to classify the web pages of an application automatically through an algorithm. The algorithm may comprise steps such as data preprocessing and feature extraction. Data preprocessing may contain steps for scrapping a webpage for textual content. The contents obtained may then be subjected to procedures as mentioned below, to extract features to build a classifier. The procedures may be tokenization wherein each sentence is converted to words, removing punctuations and tags like no script tags, style tag, and removing a stop words (frequent words) such as 'the', 'is' etc. that do not have specific semantic. The data preprocessing further comprises stemming wherein words are reduced to a root by removing inflections through dropping unnecessary characters, usually a suffix. The inflection may also be removed by determining parts of speech and utilizing a language database.

The algorithm may perform feature extraction by mapping textual data to real valued vectors through a Term Frequency-Inverse Document Frequency (TF-IDF) technique.

$$\text{Term Frequency }(TF) = \frac{(\text{Number of times 'term' appears in a document})}{(\text{Number of terms in the document})}$$

$$\text{Inverse Document Frequency }(IDF) = \log(N/n)$$

where,
N is the number of documents; and
n is the number of documents the 'term' has appeared in.

In one or more embodiments, the application crawler 310 may be configured to identify one or more application states associated with crawled web application. In an example embodiment, the URL of the web application (also referred as 'website') to be tested may be received from a user at the application crawler 310. The navigation of the website may be simulated to capture one or more application states. The navigation may indicate the one or more actions of the user while traversing the website. The one or more states may be the one or more web pages associated with the website that the user navigates. The one or more webpages may be mapped to a pre-defined reference model by the application crawler 310 to identify the one or more application states of the website. The application crawler 310 may further be configured to create a model of the website with pages mapped to the pre-defined reference model stored in the knowledge system 314.

In one or more embodiments the reference model may comprise one or more application states such as, but not limited to, home page, product page, product listing page, product category page, shopping cart page, billing page, submit order page, order summary page, check out page and/or my account page, as illustrated in Table 1. In one or more embodiments object(s) and/or element(s) present in each of the one or more web pages of the website may also be identified.

In one or more embodiments, the reinforcement learning engine 308 may be configured to calculate one or more rewards associated with the one or more identified application states, based on a reward matrix. The reward matrix may be domain specific. Table 2 illustrates a sample reward matrix for web applications in e-commerce domain.

The reinforcement learning engine 308 may be configured to identify one or more critical paths. The one or more critical paths may be such paths with maximum rewards. The maximum rewards may be determined based on at least one of a criticality of a navigation associated with a path or an error rate associated with navigating the path. More the rewards, more the criticality of navigation associated with the path. The error rates may be determined based on frequency of occurrence of the errors during the crawling and/or the predefined values associated with each of the identified errors.

The test scenario generator 304 may be configured to receive the identified one or more critical paths from the reinforcement learning engine 308. The test scenario generator 304 may further be configured to generate one or more test scripts based on the identified one or more critical paths. The test data generator 306 may be configured to generate test data.

The test scenario execution engine 302 may be configured to test the website based on the generated one or more test scripts and test data. In an example embodiment, the test scenario execution engine 302 may be implemented through an industry standard framework—Selenium. The input to the Selenium may comprise one or more scripts containing one or more critical paths, and/or actions that a user would be carrying out, such as, load URL, click action(s), accessing objects/properties located in the URL and the like. One or more test results based on the test may be captured by the behavior analyzer 312. The behavior analyzer 312 may further be configured to generate one or more insights, from the captured one or more results. The behavior analyzer 312 may be configured to check the previous test results and compare it with the captured one or more results. The outcomes of the comparison may constitute the generated one or more insights. The generated one or more insights may be used to update the reward matrix In one or more embodiments, the automated testing system 300 may be configured to test one application at a time. The automated testing system 300 may also be configured to test one or more application simultaneously, in a distributed computing environment.

In one or more embodiments, a system for autonomous testing is disclosed. The system comprises one or more components, but not limited to an application crawler, a knowledge system, a reinforcement learning engine, a test script generator, a test data generator, an autonomous test scenario execution engine and/or a behavior analyzer.

In one or more embodiments, the application crawler may be configured to crawl through one or more websites to be tested and identify one or more application states of the one or more websites automatically. The application crawler may further be configured to classify page(s) while crawling the one or more websites, by referring to the knowledge system that can map page(s) to a reference model stored in the knowledge system. The reference model may be domain specific and may comprise one or more of valid user flows and/or validation checks. The application crawler may further be configured to identify objects and elements in the one or more websites under test.

In one or more embodiments a reinforcement learning engine which may be an implementation of Q-Learning algorithm, may further be configured to identify one or more paths based on a reward matrix. A reward in the reward matrix may be determined based on at least one of criticality of navigation path and/or extent of errors encountered while navigating one or more pages of a website.

In or more embodiments, a test script generator may be configured to generate one or more test cases based on identified one or more critical paths. The automated test scenario execution engine may trigger execution of scripts causing the automated test of one or websites. The behavior analyzer may be configured to receive data such as but not limited to defect density, error information and/or application usage to further optimize the system for autonomous testing in the subsequent iterations of test.

In one or more embodiments, a method for autonomous testing is disclosed. The method comprising, receiving a Uniform Resource Locator (URL) of web application to be tested. The application crawler may traverse through the web application and may identify one or more application states and/or transitions between the one or more application states. The application crawler may further create a model of the web application. The created model of the web application may be mapped to a predefined reference model, to identify business criticalities of the identified one or more application states and/or transitions between the one or more application states.

The application crawler may evaluate the identified one or more application states for error(s). The evaluation can range from a basic HTML error(s) to a comprehensive page quality check including static accessibility evaluation(s). A reward matrix may be updated based on the errors and business criticalities identified during crawling, through a reinforcement learning algorithm. The one or more optimal test cases may be identified based on the learning from multiple reinforcement learning episodes. The one or more optimal test cases may be converted into one or more test scripts and may be executed through a test scenario execution engine.

In one or more embodiments, a non-transitory computer readable storage medium for automated testing of one or more applications is disclosed. The non-transitory computer readable storage medium stores computer executable instructions to execute one or more steps, comprising, crawling through one or more applications to be tested using an application crawler. One or more application states associated with the crawled one or more applications are identified. One or more rewards associated with the one or more identified application states are calculated using a reinforcement learning engine based on a reward matrix, wherein the reward matrix may be domain specific. One or more critical paths are identified by the reinforcement learning engine and are communicated to a test scenario generator. The one or more critical paths maybe such paths with maximum rewards. The maximum rewards may be determined based on at least one of a criticality of a navigation associated with a path or an error rate associated with navigating the path.

One or more test scripts are generated by the test scenario generator based on the identified one or more critical paths. One or more applications are tested by a test scenario execution engine based on the generated one or more test scripts, and test data generated by the test data generator. One or more test results based on the tested one or more applications are captured by a behavior analyzer. One or more insights are generated by the behavior analyzer, from the captured one or more results to update the reward matrix. Further the reward matrix is updated by the behavior analyzer based on the generated one or more insights.

The present disclosure significantly reduces the effort involved in the testing process by automating the test script generation process and identifying the optimal set of test cases to be executed. It helps to reduce human effort in Quality Assessment (QA).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A computer implemented method for autonomous testing, comprising:
   crawling, by a computing device, through one or more applications to be tested;
   identifying, by the computing device, one or more application states associated with at least one of the crawled one or more applications;
   calculating, by the computing device, one or more rewards associated with the one or more identified application states, based on a reward matrix;

identifying, by the computing device, one or more critical paths and passing the identified one or more critical paths to a test scenario generator, wherein the one or more critical paths are one or more paths with maximum rewards which are determined based on at least one of a criticality of a navigation associated with a path or an error rate associated with navigating the path;

generating, by the computing device, one or more test scripts based on the identified one or more critical paths;

generating, by the computing device, test data;

testing, by the computing device, the one or more applications based on the generated one or more test scripts and test data;

capturing, by the computing device, one or more results based on the tested one or more applications; and generating, by the computing device, one or more insights from the captured one or more results to update the reward matrix.

2. The method of claim 1, wherein the reward matrix is domain specific.

3. An automated testing system, comprises:

at least one processor; and at least one memory unit operatively coupled to the at least one processor and having instructions stored thereon that, when executed by the at least one processor, causes the at least one processor to:

crawl through one or more applications to be tested;

identify one or more application states associated with at least one of the crawled one or more applications;

calculate one or more rewards associated with the one or more identified application states, based on a reward matrix;

identify one or more critical paths and passing the identified one or more critical paths to a test scenario generator, wherein the one or more critical paths are one or more paths with maximum rewards which are determined based on at least one of a criticality of a navigation associated with a path or an error rate associated with navigating the path;

generate one or more test scripts based on the identified one or more critical paths;

generate test data;

test the one or more applications based on the generated one or more test scripts and test data;

capture one or more results based on the tested one or more applications; and generate one or more insights from the captured one or more results to update the reward matrix.

4. The system of claim 3, wherein the reward matrix is domain specific.

5. A non-transitory computer readable medium having stored thereon instructions for autonomous testing system, comprising machine executable code which when executed by at least one processor, causes the at least one processor to perform steps comprising:

crawling through one or more applications to be tested;

identifying one or more application states associated with at least one of the crawled one or more applications;

calculating one or more rewards associated with the one or more identified application states, based on a reward matrix;

identifying one or more critical paths and passing the identified one or more critical paths to a test scenario generator, wherein the one or more critical paths are one or more paths with maximum rewards which are determined based on at least one of a criticality of a navigation associated with a path or an error rate associated with navigating the path;

generating one or more test scripts based on the identified one or more critical paths;

generating test data;

testing the one or more applications based on the generated one or more test scripts and test data;

capturing one or more results based on the tested one or more applications; and generating one or more insights from the captured one or more results to update the reward matrix.

6. The non-transitory computer readable medium of claim 5, wherein the reward matrix is domain specific.

* * * * *